Patented July 26, 1949

2,477,328

UNITED STATES PATENT OFFICE 2,477,328

PREPARATION OF CATIONIC WATER-INSOLUBLE PHENOL - FORMALDEHYDE CONDENSATION PRODUCTS CONTAINING OMEGA-SULFONIC ACID RADICALS

Harold M. Day, Cos Cob, Conn., assignor to American Cyanamid Company, New York, N. Y., a corporation of Maine No Drawing. Application November 27, 1946, Serial No. 712,741

5 Claims. (Cl. 260—49)

This invention relates to cation active synthetic resins and more particularly, to an improved process for the manufacture of cation active synthetic resins prepared from phenol, formaldehyde, and an alkaline sulfiting agent.

It is well known to the art that phenol, its homologues or its alkali metal salts may be condensed with formaldehyde and then treated with a sulfite, a bisulfite or other sulfurous acid derivative or that it may be treated with the sulfurous acid derivative concurrently with condensation with formaldehyde to produce a cation active resin. Products of this type are, for example, described in U. S. Patent No. 2,228,159.

It is an object of the present invention to provide a process for preparing cation active synthetic resins of improved properties from phenol, formaldehyde and an alkaline water-soluble salt of sulfurous acid.

It is a further object of the present invention to prepare a resin from phenol, formaldehyde, and an alkaline water-soluble salt of sulfurous acid, said resin having a good density and a high capacity for the removal of cations from, or the exchange of cations in, liquid media.

These and other objects are attained by bringing about reaction between phenol, formaldehyde and an alkaline water-soluble salt of sulfurous acid in the presence of a maximum of about 40% by weight of water followed by curing the resulting resinous syrup at temperatures above 100° C.

The present invention will be described in greater detail in conjunction with the following specific examples in which the proportions are given in parts by weight. These examples are merely illustrative and it is not intended that the scope of the invention be restricted to the details therein set forth.

EXAMPLE 1

| | Parts |
|---|---|
| Anhydrous phenol (1.0 mol) | 94 |
| Anhydrous sodium bisulfite (0.25 mol) | 26 |
| Anhydrous sodium sulfite (0.25 mol) | 31.5 |
| Para-formaldehyde (2.5 mols) | 75 |
| Water | 11.3 |

The above ingredients are charged into a suitable vessel fitted with a mechanical agitator and means for reflux. The reaction mixture contains 5% by weight of water. An exothermic reaction occurs and the temperature of the reaction mixture rises to about 100° C. Refluxing is continued until a viscous syrup is obtained.

The viscous syrup is poured onto shallow trays and cured at 100° C. followed by additional heating for 16 hours at 150° C. The resin is then ground and upon evaluation of the 24–30 mesh material, found to have a capacity for the removal of cations from solution of 17.8 kilograins as calcium carbonate per cubic foot of resin, a packed volume of 26.0 cc. and a density of 25.3 lbs./cu. ft.

EXAMPLE 2

| | Parts |
|---|---|
| Anhydrous phenol (1.0 mol) | 94 |
| Anhydrous sodium bisulfite (0.25 mol) | 26 |
| Anhydrous sodium sulfite (0.25 mol) | 31.5 |
| 37% formalin (0.63) mol as HCHO) | 50.6 |
| Para-formaldehyde (1.87 mols as HCHO) | 56.2 |

The above ingredients are charged into a suitable vessel fitted with a mechanical agitator and means for reflux. The reaction mixture contains 12% by weight of water. An exothermic reaction occurs and the temperature of the reaction mixture rises to about 100° C. Refluxing is continued until a viscous syrup is obtained.

The viscous syrup is poured onto shallow trays and cured at 100° C. followed by additional heating for 16 hours at 150° C. The resin is then ground and upon evaluation of the 24–30 mesh material, found to have a capacity for the removal of cations from solution of 18.9 kilograins as calcium carbonate per cubic foot of resin, a packed volume of 27.0 cc. and a density of 26 lbs./cu. ft.

EXAMPLE 3

| | Parts |
|---|---|
| Anhydrous phenol (1.0 mol) | 94 |
| Anhydrous sodium bisulfite (0.25 mol) | 26 |
| Anhydrous sodium sulfite (0.25 mol) | 31.5 |
| 37% formalin (1.25 mols as HCHO) | 101 |
| Para-formaldehyde (1.25 mols as HCHO) | 37.5 |

The procedure of Example 2 is followed, the initial reaction mixture containing 22% by weight of water. The resin obtained has a capacity for the removal of cations from solution of 19.8 kilograins calcium carbonate per cubic foot of resin, a packed volume of 25.5 cc. and a density of 24.3 lbs./cu. ft.

EXAMPLE 4

| | Parts |
|---|---|
| Anhydrous phenol (1.0 mol) | 94 |
| Anhydrous sodium bisulfite (0.25 mol) | 26 |
| Anhydrous sodium sulfite (0.25 mol) | 31.5 |
| 37% formalin (2.5 mols as HCHO) | 202.5 |

The procedure of Example 2 is followed, the initial reaction mixture containing 36% by weight of water. The resin obtained has a capacity for the removal of cations from solution of 17.2 kilograins calcium carbonate per cubic foot of resin, a packed volume of 26.0 cc. and a density of 20.5 lbs./cu. ft.

In order to illustrate the surprising criticality of the water content of the reaction mixture insofar as preparation of superior resins of unexpected properties is concerned, the following experiments have been conducted for purposes of comparison.

Experiment 1

|  | Parts |
|---|---|
| Anhydrous phenol (1.0 mol) | 94 |
| Anhydrous sodium bisulfite (0.25 mol) | 26 |
| Anhydrous sodium sulfite (0.25 mol) | 31.5 |
| 37% formalin (2.5 mols as HCHO) | 202.5 |
| Water | 50 |

The procedure of Example 2 is followed, the initial reaction mixture containing 44% by weight of water. The resin obtained has a capacity for the removal of cations from solution of 15.3 kilograins as calcium carbonate per cubic foot of resin, a packed volume of 26.5 cc. and a density of 18.1 lbs./cu. ft.

Experiment 2

|  | Parts |
|---|---|
| Anhydrous phenol (1.0 mol) | 94 |
| Anhydrous sodium bisulfite (0.25 mol) | 26 |
| Anhydrous sodium sulfite (0.25 mol) | 31.5 |
| 37% formalin (2.5 mols as HCHO) | 202.5 |
| Water | 100 |

The procedure of Example 2 is followed, the initial reaction mixture containing 50% by weight of water. The resin obtained has a capacity for the removal of cations from solution of 15.3 kilograins calcium carbonate per cubic foot of resin, a packed volume of 27.0 cc. and a density of 19.3 lbs./cu. ft.

Experiment 3

|  | Parts |
|---|---|
| Anhydrous phenol (1.0 mol) | 94 |
| Anhydrous sodium bisulfite (0.25 mol) | 26 |
| Anhydrous sodium sulfite (0.25 mol) | 31.5 |
| 37% formalin (2.5 mols as HCHO) | 202.5 |
| Water | 150 |

The procedure of Example 2 is followed, the initial reaction mixture containing 55% by weight of water. The resin obtained has a capacity for the removal of cations from solution of 14.3 kilograins calcium carbonate per cubic foot of resin, a packed volume of 27.0 cc. and a density of 17.2 lbs./cu. ft. of resin.

It will be apparent from the foregoing experiments and examples that careful control of the water content of the initial reaction mixture containing phenol, formaldehyde and sulfurous acid derivative produces a minimum of about a 12% increase in capacity and a 10% increase in density and a maximum of about a 28% increase in capacity and a 35% increase in density.

In general, I prefer the use of reaction mixtures containing from about 5% to about 40% by weight of water in the process of the present invention. However, while the upper limit is critical and no more than 40% water may be present without a resin of inferior properties resulting, the lower limit of 5% is flexible and under carefully controlled conditions the water content of the reaction mixture may be dropped down to substantially zero without any accompanying loss in quality of the desired resin product.

Example 5

|  | Parts |
|---|---|
| Anhydrous phenol (1.0 mol) | 94 |
| Anhydrous sodium bisulfite (0.25 mol) | 26 |
| Anhydrous sodium sulfite (0.25 mol) | 31.5 |
| 37% formalin (2.5 mols as HCHO) | 202.5 |

The procedure of Example 2 is followed except that the viscous syrup is cured by heating for 5 hours at 100° C. and 16 hours at 150° C. The cured resin has a capacity for the removal of cations from solution of 16.1 kilograins calcium carbonate per cubic foot of resin, a packed volume of 25.0 cc. and a density of 19.7 lbs./cu. ft. of resin.

Example 6

Ingredients as listed in Example 5 are combined according to the details of Example 2 except that the viscous syrup is cured by heating for 6 hours at 100° C. and for 8 hours at 125° C. The cured resin has a capacity for the removal of cations from solutions of 15.4 kilograins calcium carbonate per cubic foot of resin, a packed volume of 22.0 cc. and a density of 19.6 lbs./cu. ft. of resin.

In order to illustrate the criticality of the curing temperature in the preparation of sulfonated phenol-formaldehyde cation exchange resins of superior properties the following experiment was run for purposes of comparison:

Experiment 4

|  | Parts |
|---|---|
| Anhydrous phenol (1.0 mol) | 94 |
| Anhydrous sodium bisulfite (0.25 mol) | 26 |
| Anhydrous sodium sulfite (0.25 mol) | 31.5 |
| 37% formalin (2.5 mols as HCHO) | 202.5 |

The procedure of Example 2 is followed except that the resin is cured by heating for 18 hours at 100° C. Upon evaluation it is found to have a capacity for the removal of cations from solution of 13.8 kilograins calcium carbonate per cubic foot of resin, a packed volume of 25.5 cc. and a density of 18.6 lbs./cu. ft. of resin.

By comparison of the results of Examples 5 and 6 with those of Experiment 4 above, it will be apparent that curing at a temperature above 100° C., i. e., about 125°–150° C., effects about a 10%–14% increase in the capacity of the cured resin.

Any alkaline water-soluble salt of sulfurous acid may be used in the process of the present invention. Such salts include metal salts, for example other alkali metal sulfites such as potassium sulfite, alkali metal bisulfites such as sodium metabisulfite, sodium bisulfite liquor, potassium bisulfite, etc., tertiary amine salts, for example, trimethylamine sulfite, etc., and quaternary ammonium salts, for example benzyl trimethyl ammonium bisulfite, etc. It will be apparent that mixtures of two or more of the sulfurous acid derivatives of the type listed above may be utilized in place of any single agent.

I prefer a molar ratio of formaldehyde to phenol of about 2.5:1, but the invention is in no sense limited to this particular proportion. More formaldehyde generally produces a resin of no higher capacity while less formaldehyde may result in a more water-soluble product. In general, ratios of from about 2:1 to about 5:1, formaldehyde to phenol, may be utilized.

I prefer to react the phenol and the sulfurous acid derivative in about a 1:0.5 molar ratio. If more sulfite, for example, is used the resulting resin has a tendency to swell and if less sulfite is used the resulting resin may have a lower capacity. However, the invention is in no sense restricted to this particular proportion and molar ratios of from about 1:1 to about 1:0.25, phenol to water-soluble sulfurous acid salt, may be used.

At least one molar proportion of formaldehyde must be reacted with the phenol before it is sulfonated since presumably only one of the methylol groups is sulfonated in the final resin. Evidence for this is the recovery of one mole of sodium hydroxide for each mole of phenol reacted with sodium sulfite. Accordingly, it is possible within the scope of the present invention to condense the phenol, formaldehyde and sulfurous acid salt simultaneously or to condense the phenol with excess formaldehyde and then treat the resulting condensation product with the salt. If desired, something less than the total amount of formaldehyde but at least an equimolar quantity thereof may be precondensed with the phenol, that condensation product treated with a sulfurous acid derivative, and the sulfonated product then resinified with the remainder of the formaldehyde.

It is essential to the production of cation exchange resins of improved properties according to the process of the present invention that curing be effected at high temperatures, i. e., about 125°–175° C. If the resin is finally cured at a lower temperature it has a tendency to swell and, in addition, as is demonstrated by Experiment 4, it has a lower capacity for the removal of cations from liquid media. It is desirable to precure the resins at a lower temperature, i. e., about 100° C., in order to avoid the puffing which may occur if they are subjected initially to the high curing temperature. After this pre-curing however, there is no particular advantage gained in grinding the precured resin before final curing since the resin so obtained usually does not have as good a capacity as one which is not ground between the precuring and final curing steps.

A resin of higher capacity is obtained after the reduction of free alkalinity due to the molar equivalent of alkali liberated in the reaction for every mole of sulfite used. In the foregoing examples this alkalinity has been reduced by utilization of a mixture of bisulfite and sulfite. This may also be accomplished by neutralization of the resin with an acid wash prior to curing.

The sulfur of the sulfonate group is attached to an aliphatic carbon atom in the final resin; there is no nuclear sulfonation taking place under the conditions of the reaction.

It is an advantage of the present invention that the granular, water-insoluble synthetic resins produced in accordance therewith are capable of exchanging cations in liquid media and of removing cations from liquid media. In this connection, my resinous materials may be used in admixture with other cation active materials or they may be used alone. Furthermore, my resins may be applied before gelation to a suitable carrier such as diatomaceous earth, clay, charcoal, etc. In this way, the active resin is spread on the surface of a relatively inert material and one is thus enabled to employ a smaller quantity of resin than otherwise to obtain the same active area.

Resinous materials prepared according to my invention are useful in the removal of cations from fluid media, especially aqueous solutions. The resins may be used in the hydrogen-activated form to remove cations from solutions of bases, and they may also be employed as exchange materials in accordance with the principles applied to the use of the natural and synthetic zeolites. Thus, the resin may be activated with a sodium salt such as sodium chloride and upon contact with a solution containing calcium, magnesium or other similar cation, an exchange of the latter ions for the sodium ions takes place.

The activating solutions or regenerating solutions for my resins are dilute acid solutions or dilute salt solutions, e. g., about 0.2%–10% of sulfuric acid, hydrochloric acid, sodium chloride, potassium chloride, etc.

To be sufficient insoluble for practical use in the art of water purification, a resin should have a sufficiently low solubility that it will not be dissolved away rapidly by the solution to be treated. Thus, water should not dissolve more than about 1 part of resin in 1,000 parts of water when passed through a bed of resin after the first cycle comprising an activation, exhaustion and reactivation of the resin.

It is preferable to grind and screen the resins to a particle size of from about 8–60 mesh. Use of larger particles causes channeling, and smaller particles of resin have been found to pack, thus reducing the cation exchange efficiency of the material.

My resinous materials are useful for a wide variety of purposes. Some of the uses which may be mentioned by way of example are: water purification; purification of aqueous solutions containing sugar including sugar juices; purification of water from lead pipes; removal of heavy metal ions from food, beverages and pharmaceutical products; decolorization of solutions containing coloring matters, etc. My condensation products may also be employed to recover valuable metal cations from dilute solutions, e. g., gold from sea water, chromium from chrome tanning liquors, silver from photographic baths, etc. Another important application of my materials is in the absorption or adsorption of gases such as ammonia, the amines, e. g., triethyl amine, methyl amine, etc., from fluid media, either dissolved in a liquid or from vapors.

I claim:

1. In a process for the preparation of a water-insoluble synthetic resinous material having a capacity for exchanging cations in liquid media and obtained by a process including bringing about reaction between phenol, formaldehyde and an alkaline water-soluble salt of sulfurous acid in relative molar proportions of 1:2 to 1:5, phenol:formaldehyde, and of 1:0.25 to 1:1, phenol:salt of sulfurous acid, and curing the resulting product by heating, the improvement which comprises bringing about the reaction in the presence of no more than 40% by weight of water and finally curing the resulting product at temperatures of from 125° C. to 175° C.

2. A process for preparing a granular, water-insoluble synthetic resinous material having a capacity for exchanging cations in liquid media which comprises bringing about reaction between phenol, formaldehyde and an alkaline water-soluble salt of sulfurous acid in relative molar proportions of 1:2 to 1:5, phenol:formaldehyde, and of 1:0.25 to 1:1, phenol:salt of sulfurous acid, in the presence of no more than 40% by weight of water, finally curing the reaction product obtained by heating at temperatures of from 125° C. to 175° C., and granulating the cured material to a particle size of from 8–60 mesh.

3. A process according to claim 2 in which 10% to 40% by weight of water is initially present in the reaction mixture.

4. A process according to claim 2 in which the reaction product is finally cured at 150° C.

5. A process according to claim 2 in which the reaction product is initially cured at a temperature of 100° C. and then finally cured at 125°–150° C.

HAROLD M. DAY.

REFERENCES CITED

The following references are of record in the file of this patent:

UNITED STATES PATENTS

| Number | Name | Date |
|---|---|---|
| 2,228,159 | Wassenegger et al. | Jan. 7, 1941 |
| 2,357,798 | Niederhauser et al. | Sept. 12, 1944 |